(12) United States Patent
Anchuri et al.

(10) Patent No.: US 10,678,625 B2
(45) Date of Patent: Jun. 9, 2020

(54) LOG-BASED COMPUTER SYSTEM FAILURE SIGNATURE GENERATION

(71) Applicant: NEC Laboratories America, Inc., Princeton, NJ (US)

(72) Inventors: Pranay Anchuri, Princeton Junction, NJ (US); Jianwu Xu, Lawrenceville, NJ (US); Hui Zhang, Princeton Junction, NJ (US)

(73) Assignee: NEC Corporation (JP)

( * ) Notice: Subject to any disclaimer, the term of this patent is extended or adjusted under 35 U.S.C. 154(b) by 147 days.

(21) Appl. No.: 16/033,278

(22) Filed: Jul. 12, 2018

(65) Prior Publication Data

US 2019/0079820 A1  Mar. 14, 2019

Related U.S. Application Data

(60) Provisional application No. 62/558,536, filed on Sep. 14, 2017.

(51) Int. Cl.
*G06F 11/00* (2006.01)
*G06F 11/07* (2006.01)

(52) U.S. Cl.
CPC ........ *G06F 11/079* (2013.01); *G06F 11/0751* (2013.01); *G06F 11/0778* (2013.01); *G06F 11/0787* (2013.01)

(58) Field of Classification Search
CPC .................. G06F 11/0751; G06F 11/0766–079
See application file for complete search history.

(56) References Cited

U.S. PATENT DOCUMENTS

| 6,889,218 B1* | 5/2005 | Nassehi | G06F 21/55 |
| | | | 706/45 |
| 9,069,737 B1* | 6/2015 | Kimotho | G06F 11/1484 |
| 2006/0184529 A1* | 8/2006 | Berg | G06F 11/0709 |

(Continued)

OTHER PUBLICATIONS

Nevill-Manning, "Identifying Hierarchical Structure in Sequences: a Linear-Time Algorithm", Journal of Artificial Intelligence Research, vol. 7, Sep. 1997, pp. 67-82.

(Continued)

*Primary Examiner* — Michael Maskulinski
(74) *Attorney, Agent, or Firm* — Joseph Kolodka

(57) ABSTRACT

Systems and methods for automatically generating failure signatures in a computer system for performing computer system fault diagnosis are provided. The method includes receiving log data, converting each log in the log data into a collection of log pattern sequences including one or more log pattern sequences corresponding to one or more respective failure categories associated with the computer system, generating a collection of seed patterns by computing a global set of patterns from the collection of log pattern sequences, and extracting the collection of seed patterns from the global set of patterns, generating a log pattern grammar representation for each of the one or more log pattern sequences, generating a failure signature for each of the one or more failure categories based on the log pattern grammar representation and the collection of seed patterns, and employing the failure signatures to perform computer system fault diagnosis on new log data.

20 Claims, 5 Drawing Sheets

(56) References Cited

U.S. PATENT DOCUMENTS

| | | | | |
|---|---|---|---|---|
| 2010/0223499 A1* | 9/2010 | Panigrahy | ............ | G06F 11/0709 714/19 |
| 2014/0006861 A1* | 1/2014 | Jain | ......................... | G06N 5/022 714/26 |
| 2016/0092552 A1* | 3/2016 | Morfonios | ............ | G06F 16/285 707/737 |
| 2018/0307576 A1* | 10/2018 | Debnath | ................. | G06F 11/34 |
| 2019/0179691 A1* | 6/2019 | Xu | ...................... | G06F 11/3447 |
| 2019/0324831 A1* | 10/2019 | Gu | ...................... | G06F 11/0751 |

OTHER PUBLICATIONS

Zytrax Regular Expressions—User Guide http://www.zytrax.com/tech/web/regex.htm Jul. 4, 2018 pp. 1-22 ZyTrax, Inc.

Elastic https://www.elastic.co/products/logstash accessed Jul. 11, 2018 pp. 1-9 Elasticsearch BV.

Lacaille, Jérôme. (2009). "Standardized failure signature for a turbofan engine". 2009 IEEE Aerospace conference DOI: 10.1109/AERO.2009.4839670.

Pratesh Jayaswal, A. K. Wadhwani, and K. B. Mulchandani, "Machine Fault Signature Analysis, International Journal of Rotating Machinery", Oct. 29, 2007 pp. 1-11 vol. 2008, Article ID 583982, doi:10.1155/2008/583982.

Rabenoro, Tsirizo, et al. "Interpretable Aircraft Engine Diagnostic via Expert Indicator Aggregation." Transactions on Machine Learning and Data Mining 2014 pp. 39-64.

Yinglung Liang, Yanyong Zhang, Hui Xiong, and Ramendra Sahoo. "Failure Prediction in IBM BlueGene/L Event Logs". In Proceedings of the 2007 Seventh IEEE International Conference on Data Mining (ICDM '07). IEEE Computer Society, Washington, DC, USA, Mar. 12, 2018 pp. 583-588. DOI: https://doi.org/10.1109/ICDM.2007.46.

Tao Li, Yexi Jiang, Chunqiu Zeng, Bin Xia, Wubai Zhou, Wentao Wang, Liang Zhang, Li Xue, Dewei Bao "FLAP: An End-to-End Event Log Analysis Platform for System Management", In Proceedings of the 23nd annual ACM SIGKDD International Conference on Knowledge Discovery and Data Mining (KDD), 2017.

\* cited by examiner

200

Receive log data.
210

Convert each log in the log data into a collection of log pattern sequences including one or more log pattern sequences corresponding to one or more respective failure categories associated with the computer system.
220

Generate a collection of seed patterns by extracting one or more seed patterns specific to each of the one or more failure categories from the one or more log pattern sequences.
230

Generate a log pattern grammar representation for each of the one or more log pattern sequences.
240

Generate a failure signature for each of the one or more failure categories based on the log pattern grammar representation and the collection of seed patterns.
250

Store the failure signatures in a signature database.
260

Employ the failure signatures to perform computer system fault diagnosis on new log data.
270

```
Generate failure sequence stack data
structures each representing a failure
signature sequence.
510
```

↓

```
Match testing log patterns to failure
signature sequence stack data structures.
520
```

↓

```
Determine whether the testing log
patterns correspond to at least one
known computer system failure based on
the matching.
530
```

FIG. 5

LOG-BASED COMPUTER SYSTEM FAILURE SIGNATURE GENERATION

RELATED APPLICATION INFORMATION

This application claims priority to provisional application Ser. No. 62/558,536 filed on Sep. 14, 2017, which is incorporated herein by reference herein in its entirety.

BACKGROUND

Technical Field

The present invention relates to computer system fault diagnosis, and more particularly to log-based computer system failure signature generation for performing computer system fault diagnosis.

Description of the Related Art

Logs, such as heterogeneous information technology (IT) operational logs, serve as inexpensive "sensors," recording and indicating the health status of enterprise computer systems. Many log processing and management systems are designed to analyze, understand and manage complex IT systems based on the logs. Logs can come from multiple sources written with different character encodings, where some logs may be written using single-byte encoding and other logs may be written using multi-byte encoding.

SUMMARY

According to an aspect of the present invention, a system for automatically generating failure signatures in a computer system for performing computer system fault diagnosis is provided. The system includes a memory device for storing program code. The system also includes at least one processor operatively coupled to the memory device. The at least one processor is configured to execute program code stored on the memory device to receive log data, convert each log in the log data into a collection of log pattern sequences including one or more log pattern sequences corresponding to one or more respective failure categories associated with the computer system, generate a collection of seed patterns by computing a global set of patterns from the collection of log pattern sequences, and extracting the collection of seed patterns from the global set of patterns, generate a log pattern grammar representation for each of the one or more log pattern sequences, generate a failure signature for each of the one or more failure categories based on the log pattern grammar representation and the collection of seed patterns, and employ the failure signatures to perform computer system fault diagnosis on new log data.

According to another aspect of the present invention, a computer-implemented method for automatically generating failure signatures in a computer system for performing computer system fault diagnosis is provided. The method includes at least one processor receiving log data, converting each log in the log data into a collection of log pattern sequences including one or more log pattern sequences corresponding to one or more respective failure categories associated with the computer system, generating a collection of seed patterns by computing a global set of patterns from the collection of log pattern sequences and extracting the collection of seed patterns from the global set of patterns, generating a log pattern grammar representation for each of the one or more log pattern sequences, generating a failure signature for each of the one or more failure categories based on the log pattern grammar representation and the collection of seed patterns, and employing the failure signatures to perform computer system fault diagnosis on new log data.

According to yet another aspect of the present invention, a computer program product is provided. The computer program product includes a non-transitory computer readable storage medium having program instructions embodied therewith. The program instructions are executable by a computer to cause the computer to perform a method for automatically generating failure signatures in a computer system for performing computer system fault diagnosis. The method performed by the computer includes receiving log data, converting each log in the log data into a collection of log pattern sequences including one or more log pattern sequences corresponding to one or more respective failure categories associated with the computer system, generating a collection of seed patterns by computing a global set of patterns from the collection of log pattern sequences, and extracting the collection of seed patterns from the global set of patterns, generating a log pattern grammar representation for each of the one or more log pattern sequences, generating a failure signature for each of the one or more failure categories based on the log pattern grammar representation and the collection of seed patterns, and employing the failure signatures to perform computer system fault diagnosis on new log data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 is a block/flow diagram of a system/method for automatically generating failure signatures for failures to improve fault diagnosis in a computer system, in accordance with an embodiment of the present invention;

FIG. 5 is a block/flow diagram of a system/method for performing failure signature sequence matching during computer system fault diagnosis, in accordance with an embodiment of the present invention.

DETAILED DESCRIPTION OF PREFERRED EMBODIMENTS

Figure 1:
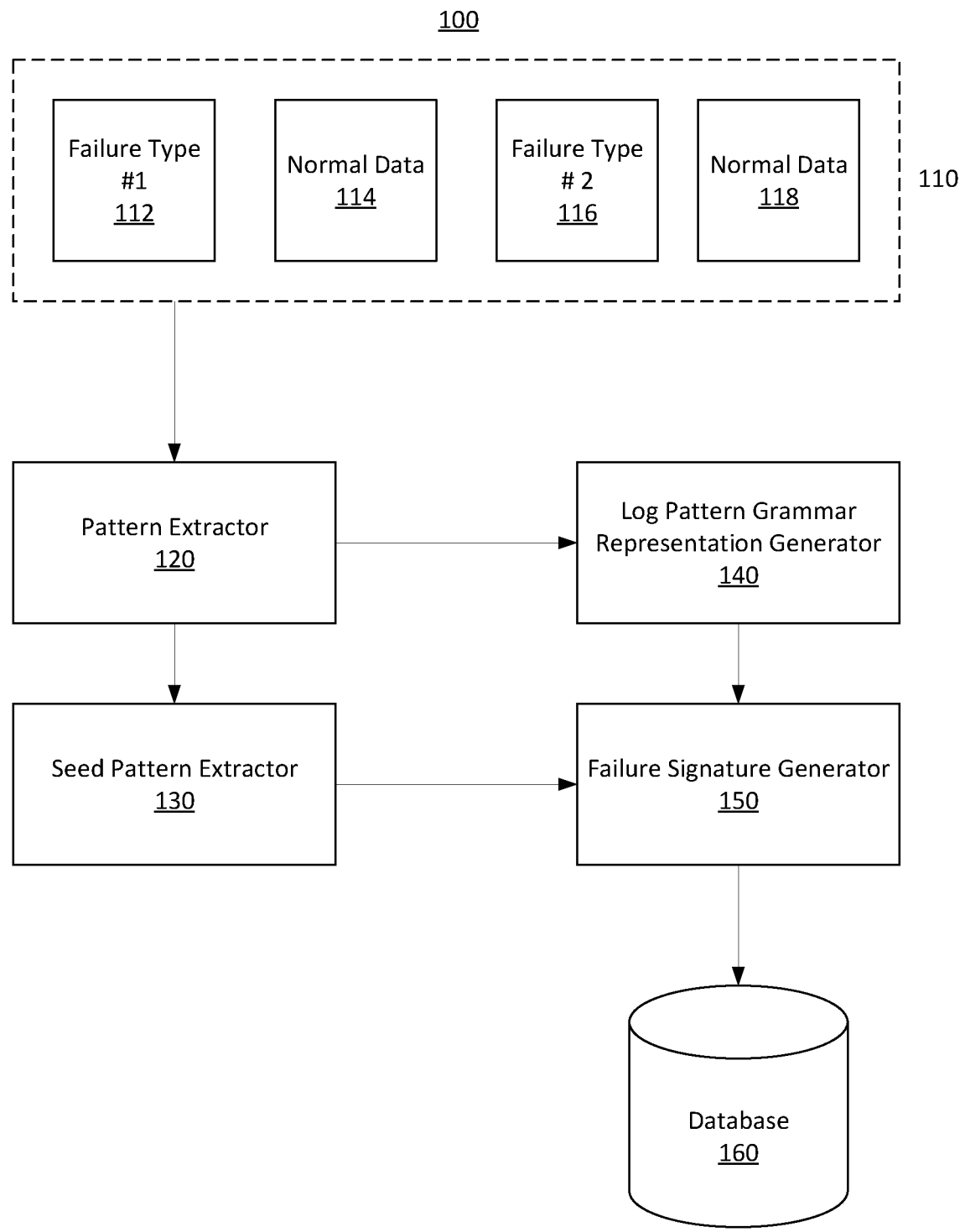
FIG. 1 is a block/flow diagram of a system/method for automatically generating failure signatures for failures to improve fault diagnosis in a computer system, in accordance with an embodiment of the present invention.

A complex computer system can fail in many different ways. In accordance with the embodiments described herein, each failure associated with a computer system can have a unique corresponding failure signature including a collection of features that describe the failure. The failure signatures generated in accordance with the embodiments described herein have useful properties for fault diagnosis of systems, including failure prediction and failure classification. Regarding failure prediction, failure signatures can indicate the onset of a type of failure based on historical data. Regarding failure classification, since each failure can have a unique failure signature, system failures can be classified based on their corresponding failure signatures.

The embodiments described herein provide for systems and methods for automatically generating failure signatures for failures associated with a computer system in a computer system for performing computer system fault diagnosis. The embodiments described herein can employ a log-based failure modeling system which, based on log data corresponding to failures, can generate a unique set of failure signatures for each category or type of failure. The embodiments described herein do not require the utilization of user-defined parameters. Furthermore, the embodiments described herein can generate signatures with limited failure data. For example, failure signatures can be generated even where there is a single instance of a failure type.

To generate failure signatures in accordance with the embodiments described herein, preprocessing can be performed that includes transforming the failure and normal data can into an ordered pattern sequence. Each pattern of the sequence can be a generalization of logs that strip out and replace log-specific information with a "wildcard" character. The failure signature generation can be performed in two stages. In the first stage, a set of unique (as compared to normal data and other failure types) patterns, referred to herein as seed patterns, are found in the failure data. The seed patterns are unique to the failure and type and is the core by which the failure signatures are to be generated. In the next stage, the neighborhood of each seed pattern is considered to determine any indications of failure signatures.

The signatures generated in accordance with the embodiments described herein include both normal patterns and seed patterns, which provides additional contextual information about the failure(s). Additionally, since the signatures can be generated from a single instance of a failure type, a signature database built in accordance with the embodiments described herein can be updated incrementally with more failure data.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now in detail to the figures in which like numerals represent the same or similar elements and initially to FIG. 1, a block/flow diagram illustrates a system 100 including a failure signature generator for automatically generating failure signatures to improve fault diagnosis in a computer system, in accordance with an embodiment. Although FIG. 1 will be illustratively described in the context of storage systems, the embodiments described herein can be applied to any suitable computer system (e.g., IT systems).

Log data 110 is provided as input to a pattern extractor 120. The log data 110 can include normal logs and/or failure logs of a computer system. The log data 110 can include raw textual logs. For example, the failure logs can include raw textual logs corresponding to each failure type. The normal logs can be used to generate seed patterns, as will be described in further detail below.

The pattern extractor 120 converts each log in the log data 110 into a corresponding pattern. In one embodiment, the pattern extractor 120 uses one or more clustering algorithms to convert each log into its corresponding pattern. The patterns correspond to generalization of the logs (e.g., structural abstractions of the logs).

In one embodiment, the pattern extractor 120 can employ a log tokenization preprocessor and a log syntactic pattern extractor to convert each log in the log data 110 into a corresponding pattern.

The log tokenization preprocessor can perform tokenization on the logs in the log data 110. The tokenization can be performed by splitting the logs with a set of predefined delimiters or rule and/or a set of or user-supplied delimiters or rules. The tokens are the smallest units of the operational logs, which are the building element of a composite log. Accordingly, the tokenization process performed by the log tokenization preprocessor can bring semi-structure information into the (unstructured) logs.

The log tokenization preprocessor can also provide an interface for users to input one or more rules, and tokenize the logs if any strings are matched against the one or more rules. Furthermore, the log tokenization preprocessor can provide an interface for users to provide a log format structure (e.g., Comma Separated Values or CSV files). Various types of timestamp formats are also recognized (e.g., matched and standardized).

The tokenization process performed by the log tokenization preprocessor can be applicable to single-byte character encodings (e.g., American Standard Code for Information Interchange or ASCII) and/or multi-byte character encodings (e.g., Unicode Transformation Format or UTF), thereby making the embodiments described herein applicable to many different language settings used in different countries.

For example, ASCII symbol tokenization can be performed by inserting white space before and after a set of ASCII symbols or punctuation marks. This may be performed without any manual inputs according to a predefined set of symbols that is applied universally across the heterogeneous logs. One exemplary set of symbols may include, for example, the following single-byte symbols: '~ ! , @ # $ % ^ & * ( ) + = { } [ ] \ | ; ' " < > . ? ‖. Each character of each log can be matched against each symbol in the above set. If a character is matched, then white space is inserted before and after that symbol. Some symbols are not considered in this set. For example, the forward slash, '/', is not in the set because this symbol is often used as a separator in uniform resource locator (URL) links. In the log processing and management system embodiments described herein, it can be more syntactically and semantically meaningful to keep an entire URL link together as one entity, rather than subject it to over-tokenization.

As another example, multi-byte symbol tokenization can be performed by inserting white space before and after each multi-byte symbol in each log. One exemplary set of multi-byte symbols may include, for example, the following multi-byte symbols: ' ~ ! @ # $ % ^ & * ( ) _ + = 『』 | ; :

'< > ? o | | ¥. When compared to the single-byte symbols set described above, the multi-byte symbols set includes many symbols with the same semantic meaning, but using a different character encoding.

The log syntactic pattern extractor can produce log syntactic patterns based on one or more clustering algorithms (e.g., one or more automated unsupervised clustering algorithms). The log syntactic patterns can capture the structural information of heterogeneous logs.

The one or more clustering algorithms can aggregate multiple tokenized logs with similar structure into multiple clusters. The similarity measure can be defined as the token category similarity. After the logs are clustered, the log syntactic pattern extractor can merge all the clustered logs to produce a final regular expression format as the log syntactic patterns. Each merge step can illustratively leverage the Smith-Waterman process to align log patterns. Initially, a sequential merge process is utilized. After several rounds of merge operations, when sequential merge fails to produce good performance, an Unweighted Pair Group Method with Arithmetic Mean (UPGMA) algorithm can be utilized. A cost function that determines the generality of patterns can be used to identify an end of pattern recognition procedure once the cost is within certain pre-defined threshold.

The patterns generated by the pattern extractor 120 are sent to a seed pattern extractor 130 to generate a collection of seed pattern sets. The collection of seed pattern sets can generally include one or more seed pattern sets corresponding to one or more respective failure categories associated with the log data 110. The seed pattern extractor 130 can generate a collection of seed pattern sets that are specific (e.g., unique) to each failure category associated with the log data 110 by extracting the collection of seed patterns from a global pattern set. The global pattern set can include a collection of log pattern sets corresponding to one or more respective failure categories extracted from the patterns of normal and failure logs. To extract the collection of seed pattern sets, the seed pattern extractor 130 can aggregate all log patterns based on failure classes so that each failure type will include a set of log patterns that are produced during a particular failure period. Then, the seed pattern extractor 130 can employ a one-versus-all approach to obtain a unique set of log patterns for each failure category. The uniqueness can be defined as the different log formats in a syntactic perspective. Accordingly, the collection of seed pattern sets corresponds to a subset of the global pattern set.

As an illustrative example, the global pattern set can include a log pattern set corresponding to a CPU failure category and a log pattern set corresponding to a memory card failure category. In this example, the log pattern set corresponding to the CPU failure category includes a plurality of patterns, including a pattern P1, a pattern P2 and a pattern P3. The pattern P1 is be represented as "P1: %{BASE16NUM:P1F1}, %{TimeStamp}, Boot information: boot from C drive is completed", the pattern P2 is be represented as "P2: %{BASE16NUM:P2F1}, %{TimeStamp}, Memory degeneration occurrence: State Asserted, BIOS", and the pattern P3 is be represented as "P3: %{BASE16NUM:P3F1}, Information, %{TimeStamp}, Slot/connector error, 10 h. The log pattern set corresponding to the memory card failure category in this example also includes a plurality of patterns, including the pattern P1, as well as a pattern P15. The pattern P15 can be represented as "P15: %{BASE16NUM:P15F1}, %{TimeStamp}, Fan {rotation speed} abnormality: warning level". Accordingly, in this example, the log pattern set corresponding to the CPU failure category and the log pattern set corresponding to the memory card failure category include at least one overlapping pattern P1.

In this illustrative example, the seed pattern extractor 130 outputs a collection of seed log pattern sets including a seed log pattern set corresponding to the CPU failure category and a seed log pattern set corresponding to the memory card failure category. In this example, the seed log pattern set corresponding to the CPU failure category includes log patterns P2 and P3, the seed log pattern set corresponding to the memory card failure category includes log pattern P15. Accordingly, each of the seed log pattern sets excludes the overlapping log pattern P1.

The patterns generated by the pattern extractor 120 are also sent to a log pattern grammar representation generator 140 to generate (e.g., infer) a log pattern grammar representation or schema for the failure patterns using a log pattern grammar generation process. In one embodiment, the log pattern grammar representation includes a grammar tree. Each log pattern grammar representation can correspond to a failure category and covers all log patterns within the corresponding failure category.

The log pattern grammar representation can be represented as a set of rules, with each rule being a summarization of a subsequence of patterns. For example, to construct a log pattern grammar representation for a corresponding failure sequence, the log pattern grammar representation generator 140 can use a process to infer a hierarchical structure from a sequence of discrete symbols by replacing repeated phrases in the sequence with grammatical rules that generate the repeated phrases.

In one embodiment, the process used by the log pattern grammar representation generator 140 to infer the hierarchical structure includes SEQUITUR. SEQUITUR can form a log pattern grammar representation given a sequence of log patterns based on repeated patterns in that sequence. Each repetition gives rise to a rule in the log pattern grammar representation, and the repeated subsequence can be replaced by a non-terminal symbol, producing a more concise representation of the overall log pattern sequence. Therefore, SEQUITUR can produce a compressed version of the log pattern sequence while forming and maintaining the grammar of the log pattern sequence. Once the grammar is finalized, the hierarchical structure for the log pattern sequence is provided.

An illustrative example of how the log pattern grammar representation generator 140 employs a process (e.g., SEQUITUR) to generate a log pattern grammar tree representation or schema will now be described. In this illustrative example, the log pattern grammar tree representation corresponds to the CPU failure category. The log pattern sequence can illustrative include the following: [P1, P2, P3, P1, P4, P2, P3, P1] For example, log patterns P1, P2 and P3 can be the same as the log patterns P1, P2 and P3 of the log pattern set for the CPU failure category described above.

The log pattern grammar representation generator 140 traverses through the log pattern sequence corresponding to the CPU failure category and produces a corresponding log pattern grammar representation. In this illustrative example, the log pattern grammar representation includes two rules for representing the log pattern sequence. The first rule, S, redefines the log pattern sequence into a shorter representation as S→ [P1, A, P4, A], and the second rule, A, defines the symbol A as A→ [P2, P3, P1]. Accordingly, the log pattern grammar representation provides a structural, compact and embedded form of a corresponding log pattern sequence.

The log pattern grammar representation generated by the log pattern grammar representation generator 140 and the collection of seed patterns generated by the seed pattern extractor 130 are sent to a failure signature generator 150. The failure signature generator 150 generates a failure signature for each failure category or type. The collection of patterns can be used to isolate important locations in the failure sequence for failure signature generation, while the log pattern grammar representation can be used to detect repeated subsequences of patterns.

Only those log pattern sequences with seed patterns are important in the characterization of system failures, since the seed patterns are unique to each failure category. Therefore, the failure signature generator 150 extracts those log pattern sequences with special conditions as follows to generate the failure signatures.

Each failure signature can include a start part, an end part and an intermediate part. The start part includes the first occurrence of a seed pattern in the log pattern grammar representation, the end part includes the seed pattern that follows the pattern of the start part, and the intermediate part includes any non-seed patterns that are accompanied by the seed patterns. The failure signature generation criterion ensures that the final failure signatures will only include those log subsequences such that they start and end with seed log patterns because this subsequence specifies the history of particular failure.

An illustrative example of a failure signature will now be described. In this illustrative example, the failure signature sequence corresponds to the CPU failure category.

In the example described above with reference to FIG. 4, the log pattern grammar representation for the CPU failure category includes two rules for representing the log pattern sequence: S→ [P1, A, P4, A] and A→ [P2, P3, P1]. Thus, the failure signature sequence for the CPU failure category is represented as A→ [P2, P3, P1] because the first occurrence should be a seed pattern, which is P2, as one of the seed patterns for CPU failure category. That is, the failure signature sequence for the CPU failure category shows that CPU failure stats with the memory degeneration, and results in slot/connector error. The failure signature sequence for the CPU failure category is assumed to be unique to CPU failure related logs. Therefore, the failure signature sequence for the CPU failure category is used as the signature for CPU failure category.

The failure signatures generated by the failure signature generator 150 can be stored in a database 160.

The failure signatures generated in accordance with the embodiments described herein have a variety of useful properties for fault diagnosis of computer systems. For example, the fault signatures generated in accordance with the embodiments described herein can indicate the onset of a particular type of failure based on historical data (e.g., failure prediction). As another example, the fault signatures generated in accordance with the embodiments described herein can classify failures (e.g., failure classification).

For instance, when a computer server failure happens, it may not be easy to determine which component of the server fails and which component of the server should be replaced to bring back services. The failure signatures generated in accordance with the embodiments described herein can be used to quickly diagnose a cause of a new system failure and recover the component. For example, the failure signature can be matched against the new logs produced during the time period associated with the new system failure. If any of the known failure signature is matched, then the new system failure can be classified as a known system failure. However, if none of the known failure signatures are matched, then the new system failure is some new failure case that has not been seen before. Further details regarding performing fault diagnosis using failure signatures are described below with reference to FIGS. 4 and 5.

Referring now to FIG. 2, a block/flow diagram is provided illustrating an overview of a system/method 200 for automatically generating failure signatures to improve fault diagnosis in a computer system, in accordance with an embodiment.

At block 210, log data is received from one or more component associated with the computer system. In one embodiment, the log data includes heterogeneous log data. The log data can include raw textual logs.

At block 220, each log in the log data is converted into a collection of log pattern sequences including one or more log pattern sequences corresponding to one or more respective failure categories associated with the computer system. Each log pattern sequence corresponds to generalization of the logs (e.g., structural abstractions of the logs). In one embodiment, one or more clustering algorithms are used to convert the logs into the log pattern sequences.

At block 230, a collection of seed patterns is generated. The collection of seed patterns can be generated by extracting one or more seed patterns specific to each of the one or more failure categories from the one or more log pattern sequences. For example, the seed pattern extractor 130 can compute a global set of patterns from the collection of log pattern sequences, and can extract the seed patterns from the global set of patterns. Accordingly, the collection of seed patterns can be a subset of the global set of patterns.

At block 240, a log pattern grammar representation for each of the one or more log pattern sequences is generated. In one embodiment, the log pattern grammar representation includes a grammar tree. The log pattern grammar representation can be represented as a set of rules, with each rule being a summarization of a subsequence of patterns. For example, to construct a log pattern grammar representation for a corresponding failure sequence, a process that infers a hierarchical structure from a sequence of discrete symbols by replacing repeated phrases in the sequence with grammatical rules that generate the repeated phrases can be used (e.g., SEQUITUR).

At block 250, a failure signature for each of the one or more failure categories is generated based on the log pattern grammar representation and the collection of seed patterns. The collection of seed patterns can be used to isolate important locations in the failure sequence for signature generation, and the log pattern grammar representation can be used to detect repeated subsequences of patterns. Each failure signature can include a start part, an end part and an intermediate part. The start part includes the first occurrence of a seed pattern in the grammar tree, the end part includes the seed pattern that follows the seed pattern of the start part, and the intermediate part includes any non-seed patterns that are accompanied by the seed patterns.

At block 260, the failure signatures are stored in a database.

Further details regarding blocks 210-260 are provided above with reference to FIG. 1.

At block 270, the failure signatures are employed to perform computer system fault diagnosis on new log data. In one embodiment, employing the failure signatures to perform computer system fault diagnosis on new log data includes performing log tokenization preprocessing on the new log data to generate tokenized new log data, parsing the tokenized new log data using the global set of patterns to generate testing log patterns, determining if the new log data matches at least one known computer system fault based on the failure signatures and the testing log patterns, and in response to determining that the new log data matches a known computer system fault based on the failure signatures and the testing log patterns, extracting matched testing log patterns that corresponding to the at least one known computer system fault. Further details regarding block 270 are described below with reference to FIGS. 4 and 5.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 3:
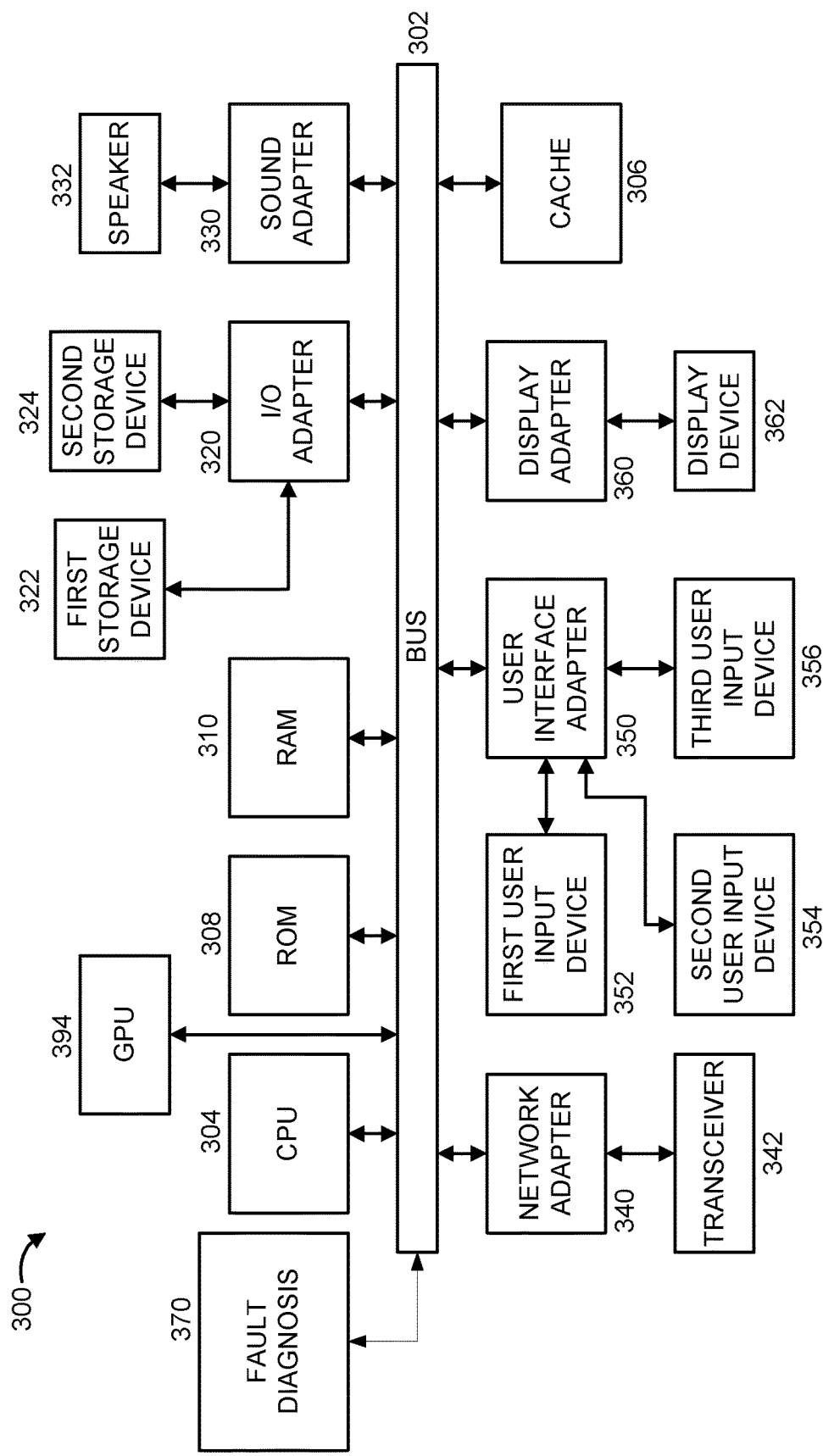
FIG. 3 is a block diagram of a processing system, in accordance with an embodiment of the present invention.

Referring now to FIG. 3, an exemplary processing system 300 is shown which may implement the embodiments described with reference to FIGS. 1, 2 and 4-8. The processing system 300 includes at least one processor (CPU) 304 operatively coupled to other components via a system bus 302. A cache 306, a Read Only Memory (ROM) 308, a Random Access Memory (RAM) 310, an input/output (I/O) adapter 320, a sound adapter 330, a network adapter 340, a user interface adapter 350, and a display adapter 360, are operatively coupled to the system bus 302.

A first storage device 322 and a second storage device 324 are operatively coupled to system bus 302 by the I/O adapter 320. The storage devices 322 and 324 can be any of a disk storage device (e.g., a magnetic or optical disk storage device), a solid state magnetic device, and so forth. The storage devices 322 and 324 can be the same type of storage device or different types of storage devices.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 352, 354, and 356 can be the same type of user input device or different types of user input devices. The user input devices 352, 354, and 356 are used to input and output information to and from system 300.

Fault diagnosis component 370 may be operatively coupled to system bus 302. Fault diagnosis component 370 is configured to perform one or more of the operations described above with reference to FIGS. 1 and 2 above and below with reference to FIGS. 4 and 5. Fault diagnosis component 370 can be implemented as a standalone special purpose hardware device, or may be implemented as software stored on a storage device. In the embodiment in which fault diagnosis component 370 is software-implemented, although shown as a separate component of the computer system 300, fault diagnosis component 370 can be stored on, e.g., the first storage device 322 and/or the second storage device 329. Alternatively, fault diagnosis component 370 can be stored on a separate storage device (not shown).

Of course, the processing system 300 may also include other elements (not shown), as readily contemplated by one of skill in the art, as well as omit certain elements. For example, various other input devices and/or output devices can be included in processing system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present principles provided herein.

Figure 4:
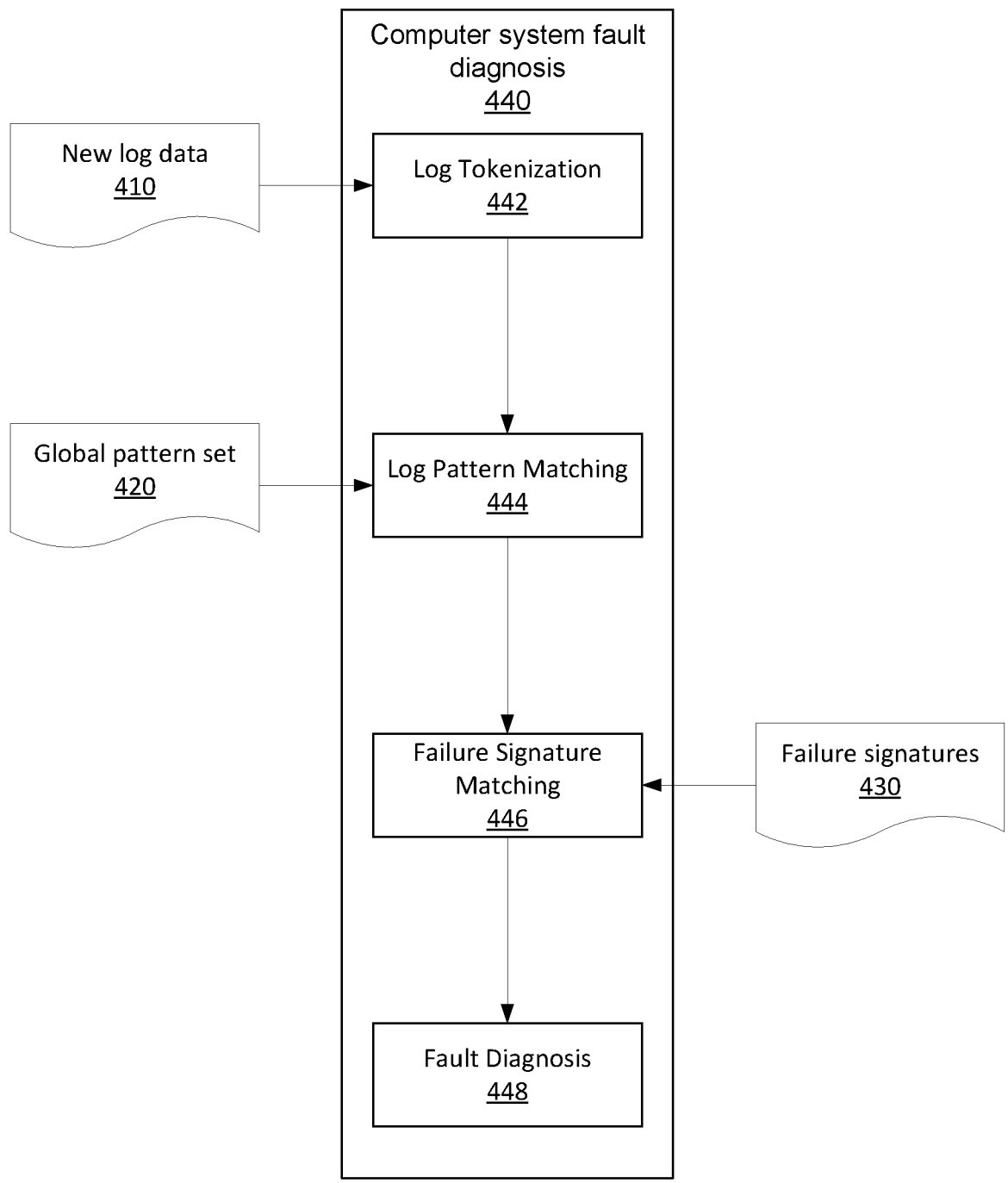
FIG. 4 is a block/flow diagram of a system/method for employing failure signatures to perform computer system fault diagnosis, in accordance with an embodiment of the present invention.

Referring to FIG. 4, a block/flow diagram is provided illustrating a system/method 400 for performing computer system fault diagnosis based on failure signatures. As shown, inputs including new log data 410, global pattern set 420 and failure signatures 430 are received by computer system fault diagnosis 440. In one embodiment, the new log data 410 includes a set of heterogeneous logs. For example, an online and live computer system can produce heterogeneous logs from multiple components. The global pattern set 420 includes an accumulation of distinct log patterns, and forms the model which represents the overall log templates within the training logs. Further details regarding the new log data 410, the global pattern set 420 and the failure signatures 430 are described above with reference to FIGS. 1 and 2.

The new log data 410 is received by log tokenization component 442 to perform log tokenization preprocessing. Log tokenization component 442 performs a function similar to that of the log tokenization preprocessor of the pattern extractor 120 described above with reference to FIG. 1.

The global pattern set 420 and the tokenized logs generated by the log tokenization component 442 are received by log pattern matching component 444. The log pattern matching component 444 then parses the tokenized logs using the global pattern set to generate testing log patterns. Any input log will be either matched to any of the extracted log patterns (e.g., regular expressions), or not matched at all. Any suitable log parsing engine can be used by the log pattern matching component in accordance with the embodiments described herein.

The testing log patterns output by the log pattern matching component 444 and the failure signatures 430 are received by the failure signature matching component 446. Computer system fault diagnosis can include determining whether the computer system has encountered the same type of failure before. If the computer system has encountered the same type of failure before, then a further determination of which type of fault may be needed to understand the current fault. The failure signature matching component 446 determines whether the new log data matches any of the failure signatures 430. Further details regarding the failure signature sequence matching performed by the failure signature matching component 446 is described below with reference to FIG. 5.

Referring now to FIG. 5, a block/flow diagram is provided illustrating a system/method 500 for performing failure signature sequence matching.

At block 510, failure sequence stack data structures are generated to hold each failure signature sequence (e.g., each failure signature sequence from the failure signatures 430 described above with reference to FIG. 4). The failure sequence stack data structures represent each failure signature sequence. In one embodiment, the log patterns of a failure signature sequence are inserted into its corresponding failure sequence stack data structure in reverse order. For example, the last log pattern of the failure signature sequence is the first log pattern to be inserted into its corresponding failure sequence stack data structure, followed by the second to last log pattern of the failure signature sequence, etc. In this manner, the top element of the failure sequence stack data structure can be arranged to be the first log pattern in the failure signature sequence.

At block 520, testing log patterns are matched to the failure signature sequence stack data structures. For example, the testing log patterns output by, e.g., the log pattern matching component 430 of FIG. 4, can be matched to any of the failure sequence stack data structures one-by-one. If a testing log pattern is the same as a top element of a given one of the failure signature sequence stack data structures, then the top element of the given failure signature sequence stack data structure is removed from the given failure signature sequence stack data structure. This procedure may continue until there are no new testing log patterns remaining.

At block 530, after the process at block 520 is complete, it is determined whether the testing log patterns correspond to at least one known computer system failure. The determination can be performed by checking whether at least one of the failure signature sequence stack data structures is empty. If at least one of the failure signature sequence stack data structures is empty, then the testing log patterns correspond to a computer system failure associated with the empty failure signature sequence stack data structure. However, if none of the failure signature sequence stack data structures are empty, this means that the testing log patterns do not correspond to a known computer system failure.

Referring back to FIG. 4, assuming that the testing log patterns corresponding to a known system fault, after a computer system failure is determined by the failure signature matching component 446, failure diagnosis component 448 can extract the matched log patterns that correspond to the known computer system fault. For example, the failure diagnosis component can extract statistics regarding the known failure, such as, e.g., the duration of the failure, and the intermediate transition period from one log pattern to the following one in the failure signature sequence. This information can help system administers understand and diagnose the details of the current computer system fault. Accordingly, the embodiments described herein provide for systems and methods for automatically generating failure signatures in a computer system for performing computer system fault diagnosis.

Having described preferred embodiments of a system and method for log-based remote device failure signature generation (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for automatically generating failure signatures in a computer system for performing computer system fault diagnosis, comprising:
   a memory device for storing program code; and
   at least one processor operatively coupled to the memory device and configured to execute program code stored on the memory device to:
   receive log data;
   convert each log in the log data into a collection of log pattern sequences including one or more log pattern sequences corresponding to one or more respective failure categories associated with the computer system;
   generate a collection of seed patterns by computing a global set of patterns from the collection of log pattern sequences, and extracting the collection of seed patterns from the global set of patterns;
   generate a log pattern grammar representation for each of the one or more log pattern sequences;
   generate a failure signature for each of the one or more failure categories based on the log pattern grammar representation and the collection of seed patterns; and
   employ the failure signatures to perform computer system fault diagnosis on new log data.

2. The system of claim 1, wherein the at least one processor is configured to convert each log into the collection of log pattern sequences by using one or more clustering algorithms.

3. The system of claim 1, wherein the log pattern grammar representation includes a grammar tree.

4. The system of claim 1, wherein the log pattern grammar representation is represented as a set of rules, each rule being a summarization of a subsequence of patterns.

5. The system of claim 1, wherein each failure signature includes a start part including a first occurrence of a first seed pattern in the log pattern grammar representation, an end part including a second seed pattern following the first seed pattern, and an intermediate part including any non-seed patterns that are accompanied by the seed patterns.

6. The system of claim 1, wherein the at least one processor is configured to employ the failure signatures to perform computer system fault diagnosis on new log data by:
   performing log tokenization preprocessing on the new log data to generate tokenized new log data;
   parsing the tokenized new log data using the global set of patterns to generate testing log patterns;
   determining if the new log data matches at least one known computer system fault based on the failure signatures and the testing log patterns; and
   in response to determining that the new log data matches a known computer system fault based on the failure signatures and the testing log patterns, extracting matched testing log patterns corresponding to the at least one known computer system fault.

7. The system of claim 6, wherein, in determining if the new log data matches a known computer system fault based on the failure signatures and the testing log patterns, the at least one processor is configured to:
- generate failure sequence stack data structures each representing a failure signature sequence;
- match the testing log patterns to the failure signature sequence stack data structures to remove elements from at least one of the failure signature sequence stack data structures; and
- after the matching, determine that the testing log patterns correspond to at least one known computer system failure in response to determining that at least one of the failure signature sequence stack data structures is empty.

8. A computer-implemented method for automatically generating failure signatures in a computer system for performing computer system fault diagnosis, comprising:
- receiving, by at least one processor operatively coupled to a memory, log data;
- converting, by the at least one processor, each log in the log data into a collection of log pattern sequences including one or more log pattern sequences corresponding to one or more respective failure categories associated with the computer system;
- generating, by the at least one processor, a collection of seed patterns by computing a global set of patterns from the collection of log pattern sequences, and extracting the collection of seed patterns from the global set of patterns;
- generating, by the at least one processor, a log pattern grammar representation for each of the one or more log pattern sequences;
- generating, by the at least one processor, a failure signature for each of the one or more failure categories based on the log pattern grammar representation and the collection of seed patterns; and
- employing, by the at least one processor, the failure signatures to perform computer system fault diagnosis on new log data.

9. The method of claim 8, wherein converting each log into the collection of log pattern sequences further includes using one or more clustering algorithms.

10. The method of claim 8, wherein the log pattern grammar representation includes a grammar tree.

11. The method of claim 8, wherein the log pattern grammar representation is represented as a set of rules, each rule being a summarization of a subsequence of patterns.

12. The method of claim 8, wherein each failure signature includes a start part including a first occurrence of a first seed pattern in the log pattern grammar representation, an end part including a second seed pattern following the first seed pattern, and an intermediate part including any non-seed patterns that are accompanied by the seed patterns.

13. The method of claim 8, wherein employing the failure signatures to perform computer system fault diagnosis on new log data further includes:
- performing log tokenization preprocessing on the new log data to generate tokenized new log data;
- parsing the tokenized new log data using the global set of patterns to generate testing log patterns;
- determining if the new log data matches at least one known computer system fault based on the failure signatures and the testing log patterns; and
- in response to determining that the new log data matches a known computer system fault based on the failure signatures and the testing log patterns, extracting matched testing log patterns corresponding to the at least one known computer system fault.

14. The method of claim 13, wherein determining if the new log data matches at least one known computer system fault based on the failure signatures and the testing log patterns further includes:
- generating failure sequence stack data structures each representing a failure signature sequence;
- matching the testing log patterns to the failure signature sequence stack data structures to remove elements from at least one of the failure signature sequence stack data structures; and
- after the matching, determining that the testing log patterns correspond to at least one known computer system failure in response to determining that at least one of the failure signature sequence stack data structures is empty.

15. A computer program product comprising a non-transitory computer readable storage medium having program instructions embodied therewith, the program instructions executable by a computer to cause the computer to perform a method for automatically generating failure signatures in a computer system for performing computer system fault diagnosis, the method performed by the computer comprising:
- receiving log data;
- converting each log in the log data into a collection of log pattern sequences including one or more log pattern sequences corresponding to one or more respective failure categories associated with the computer system;
- generating a collection of seed patterns by computing a global set of patterns from the collection of log pattern sequences, and extracting the collection of seed patterns from the global set of patterns;
- generating a log pattern grammar representation for each of the one or more log pattern sequences;
- generating a failure signature for each of the one or more failure categories based on the log pattern grammar representation and the collection of seed patterns; and
- employing the failure signatures to perform computer system fault diagnosis on new log data.

16. The computer program product of claim 15, wherein converting each log into the collection of log pattern sequences further includes using one or more clustering algorithms.

17. The computer program product of claim 15, wherein the log pattern grammar representation is represented as a set of rules, each rule being a summarization of a subsequence of patterns.

18. The computer program product of claim 15, wherein each failure signature includes a start part including a first occurrence of a first seed pattern in the log pattern grammar representation, an end part including a second seed pattern following the first seed pattern, and an intermediate part including any non-seed patterns that are accompanied by the seed patterns.

19. The computer program product of claim 15, wherein employing the failure signatures to perform computer system fault diagnosis on new log data further includes:
- performing log tokenization preprocessing on the new log data to generate tokenized new log data;
- parsing the tokenized new log data using the global set of patterns to generate testing log patterns;
- determining if the new log data matches at least one known computer system fault based on the failure signatures and the testing log patterns; and
- in response to determining that the new log data matches a known computer system fault based on the failure signatures and the testing log patterns, extracting matched testing log patterns corresponding to the at least one known computer system fault.

20. The computer program product of claim 19, wherein determining if the new log data matches at least one known computer system fault based on the failure signatures and the testing log patterns includes:
generating failure sequence stack data structures each representing a failure signature sequence;
matching the testing log patterns to the failure signature sequence stack data structures to remove elements from at least one of the failure signature sequence stack data structures; and
after the matching, determining that the testing log patterns correspond to at least one known computer system failure in response to determining that at least one of the failure signature sequence stack data structures is empty.

* * * * *